No. 637,837.　　　　　　　　　　　　　　　Patented Nov. 28, 1899.
P. & H. THEISS.
GRAIN GRINDING PROCESS.
(Application filed Jan. 6, 1896.)
(No Model.)
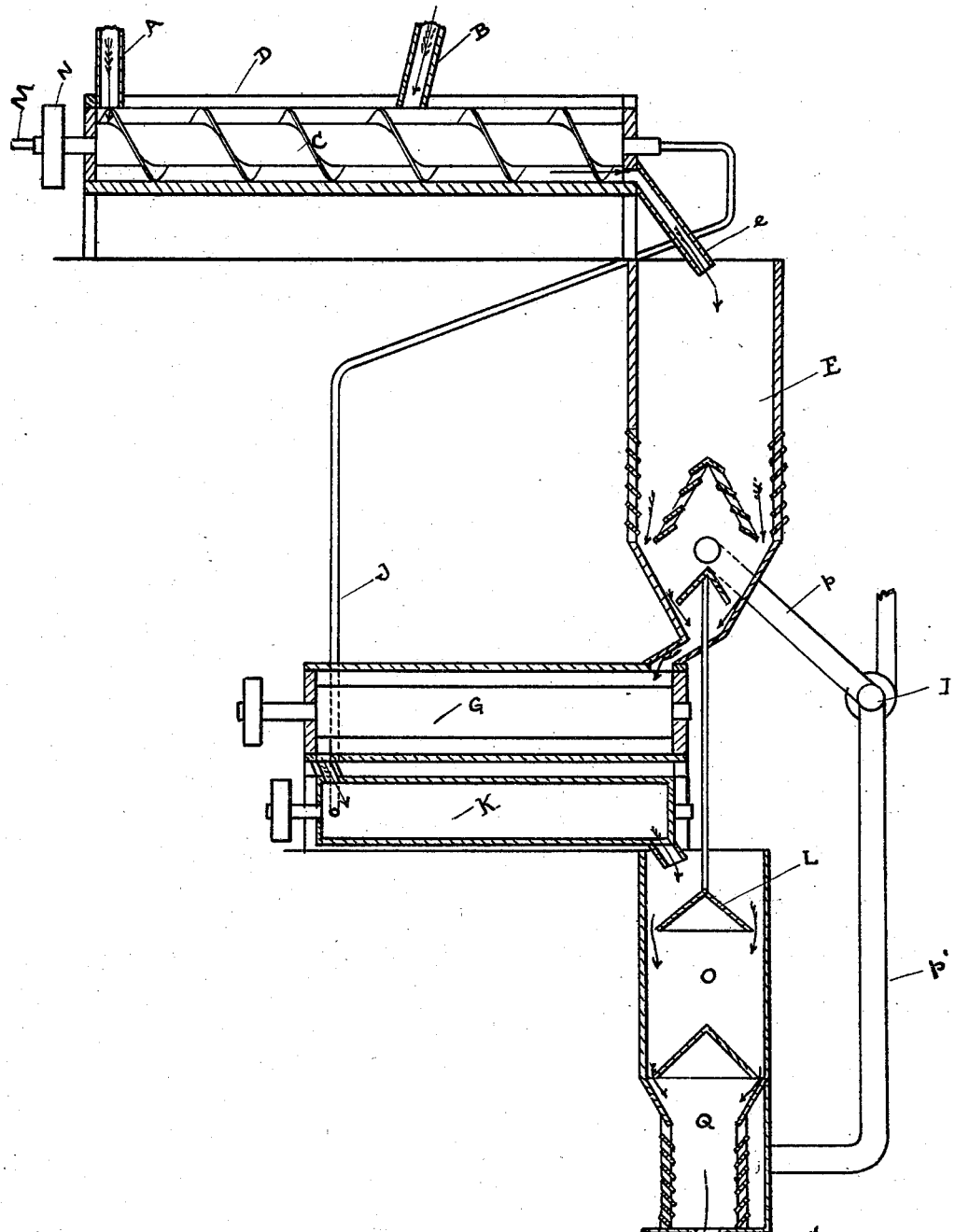
Witnesses:
W. E. Detchon
Lizzie Vallance
Inventors
Philip Theiss
Henry Theiss
By
L. D. Woodworth
Attorney.

UNITED STATES PATENT OFFICE.

PHILIP THEISS AND HENRY THEISS, OF COLUMBIANA, OHIO.

GRAIN-GRINDING PROCESS.

SPECIFICATION forming part of Letters Patent No. 637,837, dated November 28, 1899.

Application filed January 6, 1896. Serial No. 574,427. (No specimens.)

*To all whom it may concern:*

Be it known that we, PHILIP THEISS and HENRY THEISS, citizens of the United States, residing at Columbiana, in the county of Columbiana and State of Ohio, have invented certain new and useful Improvements in Grain-Grinding Processes; and we do hereby declare the following to be a full, clear, and exact description of our invention, such as will enable others skilled in the art to which it appertains to make and use the same, reference being had to the accompanying drawing, which forms part of this specification.

Our invention relates to the milling or grinding of winter and spring wheats; and its object is a process for intimately mixing or blending such wheats and tempering the same, so as to equalize the two varieties to the same conditions of density, internal dryness, and external moisture of the kernel preparatory to grinding, thus fitting the mass for the best results in the product. The object of blending the two varieties of wheat is that a blended flour gives much better results than a straight or unblended flour.

To render our process more readily intelligible, we present a drawing of the appliances that we deem preferable in its use, although any mechanism that will accomplish the same end may be used.

In the drawing the figure is a side vertical section view of the appliance above referred to, the parts of which are indicated by letters.

A and B represent in broken sections the conduits connecting the wheat-bins, the former the winter wheat and the latter the spring wheat, with the heater D. The heater D is a suitably long and preferably rectangular box having centrally and longitudinally therethrough the round steam-pipe C of suitable diameter journaled at each end in the end walls of the box D, one end presenting exterior to the box the pulley N.

M indicates the pipe which introduces steam into the pipe C for heating purposes. Around the outer walls of the steam-pipe C and attached thereto appears a spiral flange, filling the box D, so that the revolution of the steam-pipe C draws the wheat forward.

It will be observed that the winter wheat is introduced into the heating-box D at the end near the pulley N, while the spring wheat is introduced considerably forward of its central portion. This is to subject the winter wheat, which is softer than the spring wheat, showing more moisture, to a longer action of the heat radiating into the heater-box D from the steam-pipe C. The point of introduction of spring wheat must be varied to correspond with the proportions intended; but in any case the winter wheat must be given such longer distance of travel through the heater-box D as to bring to the surface of the kernel such moisture as it holds in excess of the moisture in the spring wheat used. Temperature and moisture are both to be equalized. The temperature in the box D must be varied, depending upon the length of the box and other conditions; but we have found that 120° Fahrenheit generally is best. The grain passes through the conduit $e$ into the equalizing and cooling bin E, which in its upper portion is a rectangular box open at the top and is open to the air, while retaining the grain by forming two parallel sides of a series of strips placed one above the other, each at cross-section inward and downward angle of about forty-five degrees, similar to outside window-blinds. Within the thus-opened portion of the equalizer and cooler E appears a series of similarly-placed strips, except that the angle of placement is outward and downward, the series representing in form a right-angle triangle without the base. Immediately below this two similar strips present a similar upward triangle, with upward apex. The low portion of the bin E is closed on all sides with inward and downward taper. The grain passes so slowly through the equalizing and cooling bin E that the temperature of the berries becomes equalized, while an air-current passing inward through the openings formed by the side strips, induced by a moderate suction through the pipe $p$ by means of the fan I, cools it, the grain descending to exit being thrown against the walls of the lower closed portion of the bin by means of the interior strips, as will be readily seen. From the bin E the grain passes into the usual cleaner G, connected with the dampening-cylinder K, which is connected with the pipe J, that conveys water from the steam-pipe C, resulting from the condensation of the steam, whereby the grain that has now become too dry is suitably moistened to give a tough bran, such jet of water being sufficient only to moisten the outside of the kernels, the inside remaining dry. Within the dampening-cylinder K the grain is moved by a spiral mechanism as in the heater C. From the cleaner the grain passes into the tempering-hopper O, which is a rectangular box inwardly beveled immediately above its open-sided portion, and provided above said beveled portion and also near the top with two similar triangular formations, similar to the one described as located in the lower portion of the bin E, for the purpose of throwing the current of the grain against the walls. The open-sided portion which occurs below the bevel is the same as the sides of the similar portion of the bin E, the pipe $p'$, connected with the fan I, inducing by suction an air-current through the grain. From this hopper O the grain goes to the rolls perfectly prepared for grinding.

It will be at once perceived by any experienced miller that our process may be applied with excellent results in the preparation for grinding of winter wheat alone, and also of those varieties of spring wheats that do not come to hand suitably dry in the interior of the kernel. As, however, a mixture of winter and spring wheats gives the best product in a strong flour, we regard our invention in mixing the grain before grinding as the most important feature.

As already stated, any mechanism or means may be employed that will produce the result of the above-described process, our invention being confined solely to the process of raising winter wheat in any suitable receptacle to temperature that will bring its latent moisture to the surface of the kernel and intimately intermixing therewith spring wheat in any proportions, the mass then being held by any suitable means until the temperatures and moistures of the kernels in both varieties are equalized and afterward cooled, the same being slightly dampened before going to the rolls.

To treat any wheat without intermixing varieties, as above specified, preparatory to grinding is also within the spirit and scope of our invention.

Having fully described our invention, what we claim, and desire to secure by Letters Patent, is—

A process for preparing winter and spring wheat blend for grinding, in which the winter wheat is heated till the latent moisture thereof is brought to the surface, the spring wheat is heated to a much less degree and for a much less period, the wheats being then intermingled and dried, then superficially moistened and passed to the grinding apparatus, substantially as described.

In testimony whereof we hereunto affix our signatures in the presence of two witnesses.

PHILIP THEISS.
    HENRY THEISS.

Witnesses:
  N. E. DETCHON,
  DANIEL MOYER.